UNITED STATES PATENT OFFICE.

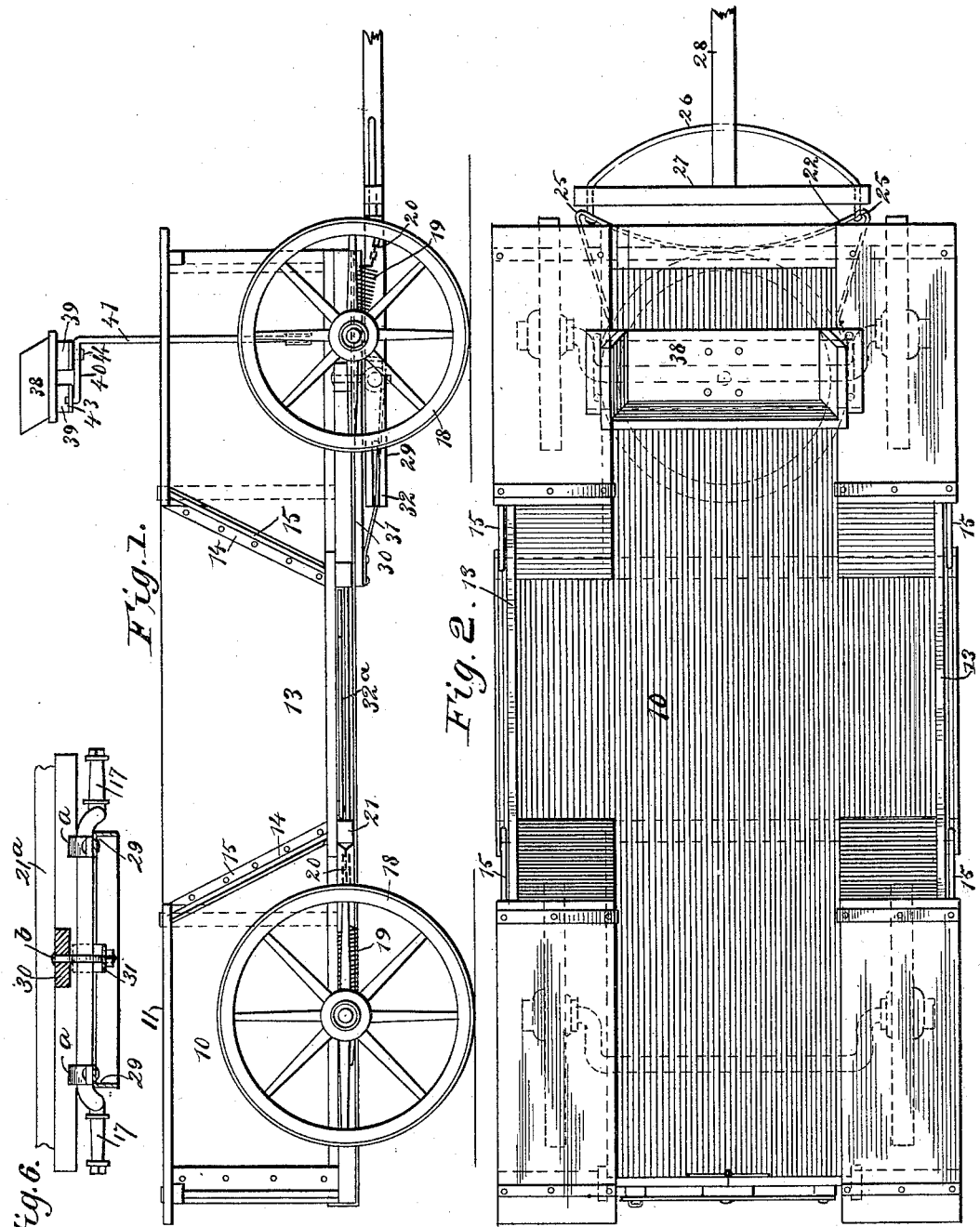

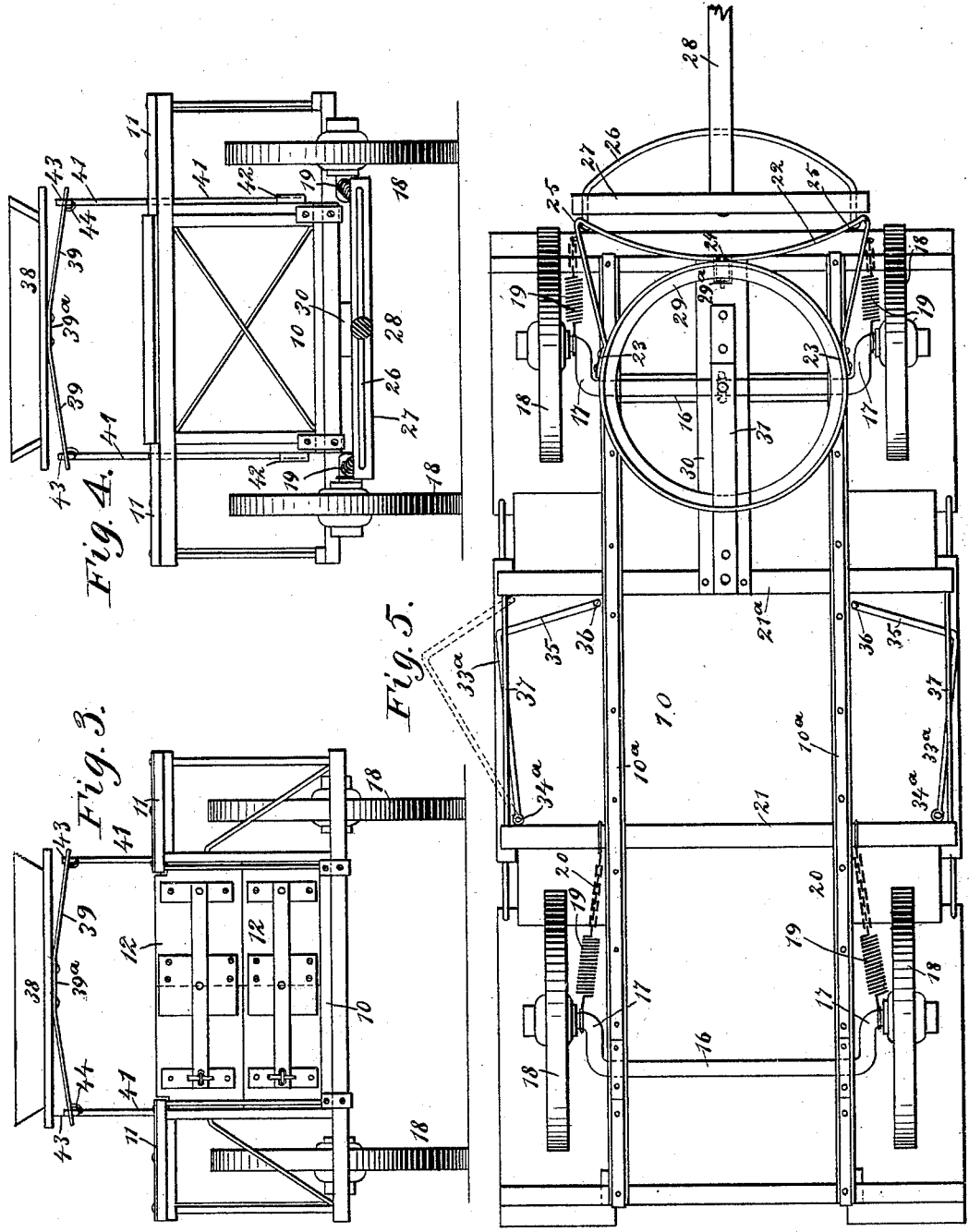

PAUL HUGH MUNROE, OF PLAINFIELD, ILLINOIS.

WAGON.

SPECIFICATION forming part of Letters Patent No. 466,615, dated January 5, 1892.

Application filed April 11, 1891. Serial No. 388,490. (No model.)

*To all whom it may concern:*

Be it known that I, PAUL HUGH MUNROE, of Plainfield, in the county of Will and State of Illinois, have invented a new and Improved Wagon, of which the following is a full, clear, and exact description.

My invention relates to improvements in wagons; and the object of my invention is to produce a wagon which may be easily loaded and unloaded, which is especially adapted for farm-work, which rides easy, hauls easily, turns in a comparatively small space, which is provided with adjustable springs, which also serve to equalize the strain on the wagon, which is provided with adjustable cutters for cutting corn or other produce, and which is provided with a variety of improved details of construction, which will be hereinafter fully described.

To this end my invention consists of a wagon constructed as hereinafter described and claimed.

Reference is to be had to the accompanying drawings, forming a part of this specification, in which similar figures of reference indicate corresponding parts in all the views.

Figure 1 is a broken side elevation of a wagon embodying my invention. Fig. 2 is a plan view of the same. Fig. 3 is a rear end view. Fig. 4 is a front end view, the pole being in section. Fig. 5 is a broken inverted plan view of the wagon; and Fig. 6 is a detail view, partly in section, showing the manner of securing the fifth-wheel to the axle.

The wagon-body 10 is provided with sills which extend longitudinally beneath it in the usual way, and the sills are strengthened by metallic bands 10ª, which are secured to their under sides and extend the entire length of the wagon. The wagon-body is provided along the sides with laterally-extending fenders 11, which are supported by suitable cross timbers and braces, and which adapt the wagon for use in transporting hay or other bulky matter, with the usual rear end opening, which is closed by the double end-boards 12, although any desired form of end-boards may be used, and with opposite side openings, which are closed by the side-boards 13, the openings and boards tapering toward the bottom, and the boards are removable and are provided with flanges 14, which fit between the wagon-fenders and the rods 15.

The side-boards are removed by lifting them, and it will be seen that by removing the side-boards and end-boards the wagon may be very quickly loaded or unloaded.

The wagon-body is supported upon crank-axles 16, which are bent near the ends, as shown at 17, the bend coming just outside the outer sides of the wagon-body, and the ends of the axles are mounted in wheels 18 in the usual way. Secured to the axles adjacent to the wheels and at the ends of the bends 17 are spiral springs 19, which are secured at their other ends in links of chains 20, the rear chains being secured to a cross-timber 21 on the wagon-body, and the forward chains being secured to a frame 22, which frame is formed of a bent bar, the ends being secured at 23 to opposite sides of the fifth-wheel 29, and the front central portion of the frame being secured to the circumference of the fifth-wheel, as shown at 24 in Fig. 5.

The frame 22 extends at the front corners to points a little in advance of the fifth-wheel, and is then bent inwardly and rearwardly, as shown at 25 in Fig. 5, and to the outer portions of this frame are secured the ends of the braces 26, which extend through the ends of the cross-bar 27 and through the pole 28, which is mortised into the cross-bar in the usual way, the braces 26 thus serving to brace the cross-bar and pole. It is obvious, however, that a pair of shafts may be secured to the cross-bar in place of the pole.

The fifth-wheel 29 is pivoted to the forward axle 16 by boxes *a*, secured to the flange of the fifth-wheel, as clearly shown in Fig. 6, the wheel bearing upon the axle near the ends of the latter, so that the strain of the wagon-body will be removed from the middle of the axle. A bolster 30, which is secured longitudinally to the under side and forward end of the wagon-body, rests upon the fifth-wheel, the bolster being provided with a roller 29ª at the point where it contacts with the fifth-wheel, as best shown in Fig. 5, so as to remove friction. The king-bolt *b* is provided with an eye in its lower end, through which passes the axle. A spring-guide 31 is secured to the rear end of the bolster and extends forward through a slot 32 in the fifth-wheel, the guide being bent downward beneath the axle, to which it is pivoted, and having its front end secured to the bolster in front of the axle.

It will be noticed that the center of the fifth-wheel comes behind the center of the wheels 18, and consequently the wagon-body is adapted to turn in a comparatively small space.

On the under side of the wagon-body, near the middle and on opposite sides, are the cutters 33ª, each comprising a rod which is pivoted at the rear end to the wagon-body, as shown at 34ª, and the front portions of the cutters are bent inward, as shown at 35, and terminate in a depending stop 36, and the stops of the cutters are adapted to engage the rods 37, which extend longitudinally beneath the cross-timbers 21 and 21ª on the wagon-body, and when the cutters are swung outward the stops limit their movements and they assume the position indicated by dotted lines in Fig. 5. The front portions of the parts 35 are sharpened, and, if desired, the rear portions of the cutters may be also sharpened, and it will be seen that when the wagon is drawn across a field of corn or other produce the cutters will come in contact with the stalks and will cut them off.

The wagon is provided with a seat 38, which is arranged to cross the front portion of the body, and on the under side of the seat a pair of springs 39 are centrally secured to the seat, as shown at 39ª, the free ends of which normally extend downward and rest upon the bent ends 40 of the vertical rods 41, which rods extend downward on each side of the wagon-body and are held in sockets 42, secured to the wagon-sills. The upper ends of the rods 41 terminate in vertical projections or studs 43, which project into holes in the back springs of the seat, and the front spring is provided with depending lugs 44, which clasp the bent portions 40 of the rods 41, and it will thus be seen that the seat will be held securely, and by raising the front of the seat so that the lugs will clear the rods the rods may be turned so as to swing the seat around in front of the wagon, where it will not interfere with loading operations.

It will be noticed that the tension of the springs 19 will normally hold the crank portions of the axles in a horizontal position, as best shown in Fig. 5, and when a load is placed in the body the axles will turn downward, thus throwing the tension upon the springs 19, and the tension of the springs may be adjusted by hooking them into different links of the chains 20 to adapt them to the load of the wagon. The springs cause the wagon to ride very easily, thus making it carry the load steadily, and the crank construction of the axles permits the body to be brought close to the ground, so that it is extremely convenient in transporting live stock. The construction of the fifth-wheel and the frame and springs connected therewith always keeps the springs in a definite position in relation to the axle.

Having thus described my invention, I claim as new and desire to secure by Letters Patent—

1. A wagon comprising a body mounted on crank-axles which are supported in wheels, and spiral springs connecting the cranks of the axles with the body, substantially as described.

2. A wagon comprising a body mounted on crank-axles which are carried in wheels, and spiral springs secured to the cranks of the axles and adjustably connected with the wagon-body, substantially as described.

3. A wagon comprising a body mounted on crank-axles which are carried in wheels, the cranks of the rear axle being connected directly with the wagon-body by spiral springs, a fifth-wheel mounted on the forward axle and supporting the wagon-body, and spiral springs secured to the cranks of the forward axle and to a frame on the fifth-wheel, substantially as described.

4. In a wagon, the combination, with the body and the forward crank-axle, of a fifth-wheel carried by the axle, a longitudinal bolster secured to the body and resting upon the fifth-wheel, a forwardly-extending frame secured to the fifth-wheel, and spiral springs having their rear ends secured to the cranks of the axles and their front ends connected with the frame of the fifth-wheel, substantially as described.

5. In a wagon, the combination, with the wagon-body having a longitudinal bolster thereon and the forward crank-axle, of a fifth-wheel carried by the axle and sustaining the weight of the bolster, the center of the fifth-wheel being behind the center of the wagon-wheels, substantially as described.

6. The combination, with the forward crank-axle and the wagon-body having a longitudinal bolster thereon, of a fifth-wheel mounted on the axle, a frame secured to the front portion of the fifth-wheel, and spiral springs connecting the frame and the cranks of the axles, substantially as described.

7. In a wagon, the combination, with the wagon-body, the forward crank-axle, and the fifth-wheel mounted on the axle, of a bolster secured to the under side of the body and resting upon the fifth-wheel, and a guide secured to the bolster and extending through a slot in the fifth-wheel, substantially as described.

8. In a wagon, the combination of the wagon-body, the forward crank-axle, the fifth-wheel mounted on the axle, and the longitudinal bolster secured to the body and carrying a roller which runs on the fifth-wheel, substantially as described.

PAUL HUGH MUNROE.

Witnesses:
J. WALES MUNROE,
ERNEST A. BILLING.